(12) United States Patent
Reda et al.

(10) Patent No.: US 9,286,688 B2
(45) Date of Patent: Mar. 15, 2016

(54) AUTOMATIC SEGMENTATION OF ARTICULATED STRUCTURES

(71) Applicant: Siemens Medical Solutions USA, Inc., Malvern, PA (US)

(72) Inventors: Fitsum Aklilu Reda, Malvern, PA (US); Zhigang Peng, Bluebell, PA (US); Shu Liao, Chester Springs, PA (US); Gerardo Hermosillo Valadez, West Chester, PA (US); Yoshihisa Shinagawa, Downingtown, PA (US); Yiqiang Zhan, West Chester, PA (US); Xiang Sean Zhou, Exton, PA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 47 days.

(21) Appl. No.: 14/450,325

(22) Filed: Aug. 4, 2014

(65) Prior Publication Data

US 2015/0043809 A1 Feb. 12, 2015

Related U.S. Application Data

(60) Provisional application No. 61/864,038, filed on Aug. 9, 2013.

(51) Int. Cl.
*G06K 9/00* (2006.01)
*G06T 7/00* (2006.01)
(Continued)

(52) U.S. Cl.
CPC .............. *G06T 7/0089* (2013.01); *G06K 9/468* (2013.01); *G06K 9/6206* (2013.01); *G06T 7/0028* (2013.01); *G06T 7/0081* (2013.01); *G06K 9/00214* (2013.01); *G06T 2207/20121* (2013.01);

(Continued)

(58) Field of Classification Search
None
See application file for complete search history.

(56) References Cited

U.S. PATENT DOCUMENTS

2009/0262998 A1* 10/2009 Wang .................... G06F 19/321
382/131
2010/0067760 A1* 3/2010 Zhang .................... G06K 9/00
382/130

(Continued)

OTHER PUBLICATIONS

Ryu, Jae Hun, et al. "Analysis of skin movements with respect to bone motions using MR images." International Journal of CAD/CAM 3.1 (2009).

(Continued)

*Primary Examiner* — Wesley Tucker
(74) *Attorney, Agent, or Firm* — Peter R. Withstandley

(57) ABSTRACT

Disclosed herein is a framework for segmenting articulated structures. In accordance with one aspect, the framework receives a target image, a reference image, statistical shape models, local appearance models and a learned landmark detector. The framework may automatically detect first centerline landmarks along centerlines of articulated structures in the target image using the learned landmark detector. The framework may then determine a non-rigid transformation function that registers second centerline landmarks along centerlines of articulated structures in the reference image with the first centerline landmarks. Mean shapes of the statistical shape models may then be deformed to the target image space by applying the non-rigid transformation function on the mean shapes. The framework may further search for candidate points in the mean shapes using the local appearance models. The mean shapes may be fitted to the candidate points to generate a segmentation mask.

20 Claims, 9 Drawing Sheets

Unfolded Hand      Folded Hand

(51) Int. Cl.
*G06K 9/46* (2006.01)
*G06K 9/62* (2006.01)

(52) U.S. Cl.
CPC ............... *G06T 2207/20128* (2013.01); *G06T 2207/30008* (2013.01)

(56) References Cited

U.S. PATENT DOCUMENTS

2010/0177946 A1* 7/2010 De Bruijne .......... G06K 9/6209 382/132
2012/0155734 A1* 6/2012 Barratt .................. G06T 7/0032 382/131

OTHER PUBLICATIONS

Kamojima, Satomi, et al. "Identification of position and orientation of hand bones from MR Images by bone model registration." Intelligent Robots and Systems, 2004.(IROS 2004). Proceedings. 2004 IEEE/RSJ International Conference on. vol. 2. IEEE, 2004.

Liu, Jiamin, et al. "Rigid model-based 3D segmentation of the bones of joints in MR and CT images for motion analysis." Med. Phys. 35 (8) Aug. 2008, pp. 3637-3649.

Chen, Hsin-Chen, et al. "Registration-based segmentation with articulated model from multipostural magnetic resonance images for hand bone motion animation." Medical physics 37.6 (2010): 2670-2682.

T.F. Cottes et al. "Active Shape Models—Their Training and Application", Computer Vision and Image Understanding, 61 (1): pp. 38-59, 1995.

Arun, K. Somani, et al. "Least-squares fitting of two 3-D point sets." Pattern Analysis and Machine Intelligence, IEEE Transactions on 5 (1987): 698-700.

* cited by examiner

US 9,286,688 B2

AUTOMATIC SEGMENTATION OF ARTICULATED STRUCTURES

CROSS-REFERENCE TO RELATED APPLICATION

This application claims the benefit of U.S. provisional application No. 61/864,038 filed on Aug. 9, 2013, the entire contents of which are incorporated herein by reference.

TECHNICAL FIELD

The present disclosure generally relates to diagnostic imaging and, more specifically, to automated or semi-automated systems and methods for facilitating segmentation of articulated structures.

BACKGROUND

The field of medical imaging has seen significant advances since the time X-Rays were first used to determine anatomical abnormalities. Medical imaging hardware has progressed from modern machines such as Medical Resonance (MR) imaging scanners, Computed Tomographic (CT) scanners and Positron Emission Tomographic (PET) scanners, to multimodality imaging systems such as PET-CT and PET-MRI systems. Because of large amount of image data generated by such modern medical scanners, there has been and remains a need for developing image processing techniques that can automate some or all of the processes to determine the presence of anatomical abnormalities in scanned medical images.

Digital medical images are constructed using raw image data obtained from a scanner, for example, a CAT scanner, MRI, etc. Digital medical images are typically either a two-dimensional ("2D") image made of pixel elements, a three-dimensional ("3D") image made of volume elements ("voxels") or a four-dimensional ("4D") image made of dynamic elements ("doxels"). Such 2D, 3D or 4D images are processed using medical image recognition techniques to determine the presence of anatomical abnormalities such as cysts, tumors, polyps, etc. Given the amount of image data generated by any given image scan, it is preferable that an automatic technique should point out anatomical features in the selected regions of an image to a doctor for further diagnosis of any disease or condition.

Automatic image processing and recognition of structures within a medical image is generally referred to as Computer-Aided Detection (CAD). A CAD system can process medical images, localize and segment anatomical structures, including possible abnormalities (or candidates), for further review. Recognizing anatomical structures within digitized medical images presents multiple challenges. For example, a first concern relates to the accuracy of recognition of anatomical structures within an image. A second area of concern is the speed of recognition. Because medical images are an aid for a doctor to diagnose a disease or condition, the speed with which an image can be processed and structures within that image recognized can be of the utmost importance to the doctor in order to reach an early diagnosis. Hence, there is a need for improving recognition techniques that provide accurate and fast recognition of anatomical structures and possible abnormalities in medical images.

Many CAD or treatment applications would benefit from automatic and precise segmentation of articulated bones in CT images. FIG. 1 shows surface models (102 and 104) of an unfolded hand and folded hand respectively. The human hand anatomy typically includes 19 bones. Automatically segmenting hand bones remains a challenging task. This is largely due to the highly articulated nature of hand bones, which limits the effectiveness of registration-based segmentation methods. The use of low-level information, such as edge and grey level information derived from the target image (i.e., the image to be segmented) alone is insufficient for segmenting bones or distinguishing different bones that are in close proximity to each other.

SUMMARY

The present disclosure relates to a framework for facilitating automatic segmentation of articulated structures. In accordance with one aspect, the framework receives a target image, a reference image, statistical shape models, local appearance models and a learned landmark detector. The framework may automatically detect first centerline landmarks along centerlines of articulated structures in the target image using the learned landmark detector. The framework may then determine a non-rigid transformation function that registers second centerline landmarks along centerlines of articulated structures in the reference image with the first centerline landmarks. Mean shapes of the statistical shape models may then be deformed to the target image space by applying the non-rigid transformation function on the mean shapes. The framework may further search for candidate points in the mean shapes using the local appearance models. The mean shapes may be fitted to the candidate points to generate a segmentation mask.

This summary is provided to introduce a selection of concepts in a simplified form that are further described below in the following detailed description. It is not intended to identify features or essential features of the claimed subject matter, nor is it intended that it be used to limit the scope of the claimed subject matter. Furthermore, the claimed subject matter is not limited to implementations that solve any or all disadvantages noted in any part of this disclosure.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings. Furthermore, it should be noted that the same numbers are used throughout the drawings to reference like elements and features.

DETAILED DESCRIPTION

Figure 1:
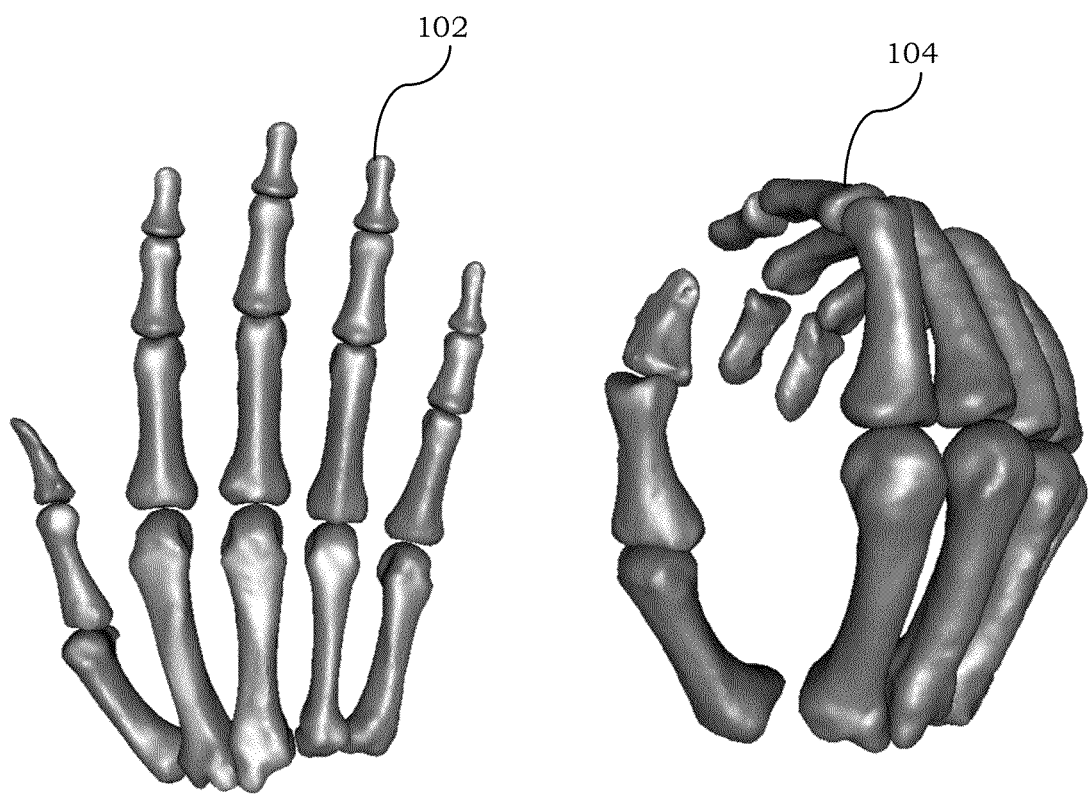
FIG. 1 shows surface models of an unfolded hand and folded hand respectively.

In the following description, numerous specific details are set forth such as examples of specific components, devices, methods, etc., in order to provide a thorough understanding of embodiments of the present invention. It will be apparent, however, to one skilled in the art that these specific details need not be employed to practice embodiments of the present invention. In other instances, well-known materials or methods have not been described in detail in order to avoid unnecessarily obscuring embodiments of the present invention. While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention.

The term "x-ray image" as used herein may mean a visible x-ray image (e.g., displayed on a video screen) or a digital representation of an x-ray image (e.g., a file corresponding to the pixel output of an x-ray detector). The term "in-treatment x-ray image" as used herein may refer to images captured at any point in time during a treatment delivery phase of a radiosurgery or radiotherapy procedure, which may include times when the radiation source is either on or off. From time to time, for convenience of description, CT imaging data may be used herein as an exemplary imaging modality. It will be appreciated, however, that data from any type of imaging modality including, but not limited to, X-Ray radiographs, MRI, CT, PET (positron emission tomography), PET-CT, SPECT, SPECT-CT, MR-PET, 3D ultrasound images or the like may also be used in various embodiments of the invention.

Unless stated otherwise as apparent from the following discussion, it will be appreciated that terms such as "segmenting," "generating," "registering," "determining," "aligning," "positioning," "processing," "computing," "selecting," "estimating," "detecting," "tracking" or the like may refer to the actions and processes of a computer system, or similar electronic computing device, that manipulates and transforms data represented as physical (e.g., electronic) quantities within the computer system's registers and memories into other data similarly represented as physical quantities within the computer system's memories or registers or other such information storage, transmission or display devices. Embodiments of the methods described herein may be implemented using computer software. If written in a programming language conforming to a recognized standard, sequences of instructions designed to implement the methods can be compiled for execution on a variety of hardware platforms and for interface to a variety of operating systems. In addition, embodiments of the present invention are not described with reference to any particular programming language. It will be appreciated that a variety of programming languages may be used to implement embodiments of the present invention.

As used herein, the term "image" refers to multi-dimensional data composed of discrete image elements (e.g., pixels for 2D images, voxels for 3D images, doxels for 4D images, etc.). The image may be, for example, a medical image of a subject collected by computed tomography, magnetic resonance imaging, ultrasound, or any other medical imaging system known to one of skill in the art. The image may also be provided from non-medical contexts, such as, for example, remote sensing systems, electron microscopy, etc. The methods of the inventions can be applied to images of any dimension, e.g., a 2D picture, 3D or 4D volume. For a 2- or 3-dimensional image, the domain of the image is typically a 2- or 3-dimensional rectangular array, wherein each pixel or voxel can be addressed with reference to a set of two or three mutually orthogonal axes. The terms "digital" and "digitized" as used herein will refer to images or volumes, as appropriate, in a digital or digitized format acquired via a digital acquisition system or via conversion from an analog image.

A framework for segmenting articulated structures is described herein. In accordance with one aspect, an articulated statistical shape model (SSM) is combined with a local exemplar-based appearance model for automatically segmenting articulated structures (e.g., hand bones in CT image data). The framework may perform a hierarchical articulated shape deformation that is driven by a local exemplar-based appearance model determined from a number of training images. Each point in the shape model may be associated with a local appearance model described by a set of one-dimensional (1D) average profiles of intensity and first-order gradient features sampled along the surface normals at points of a patch centered as that point.

During segmentation, each point in the shape model may be deformed to a new point. The new point may be determined by searching along the surface normal whose image features are the most similar to the image features captured by the appearance model. To make the search strategy robust to poor image quality, the search may be performed hierarchically. For example, at the coarse stage, a search may be performed along a profile of length 11 mm centered at the given point, the next stage along a profile of length 5.5 mm, and the fine stage along a profile of length 2.75 mm. During the deformation, the shape model may also be constrained by an articulation model described by a set of pre-determined landmarks on the finger joints such that the topology of the fingers is preserved. In this way, the deformation is robust to sporadic false bony edges, and is able to fit fingers with large articulations.

For purposes of illustration, the following describes the framework as applied to segmenting hand bones. However, the present framework can be applied to segmenting any type of articulated structures that allow movement, including but are not limited to, other types of articulated bone structures such as foot bones, hip bones, wrist bones, elbow bones, knee bones, and so forth. The medical image data may also be acquired by any imaging modalities, such as CT, MR, PET, radiographs, and so forth.

Figure 2:
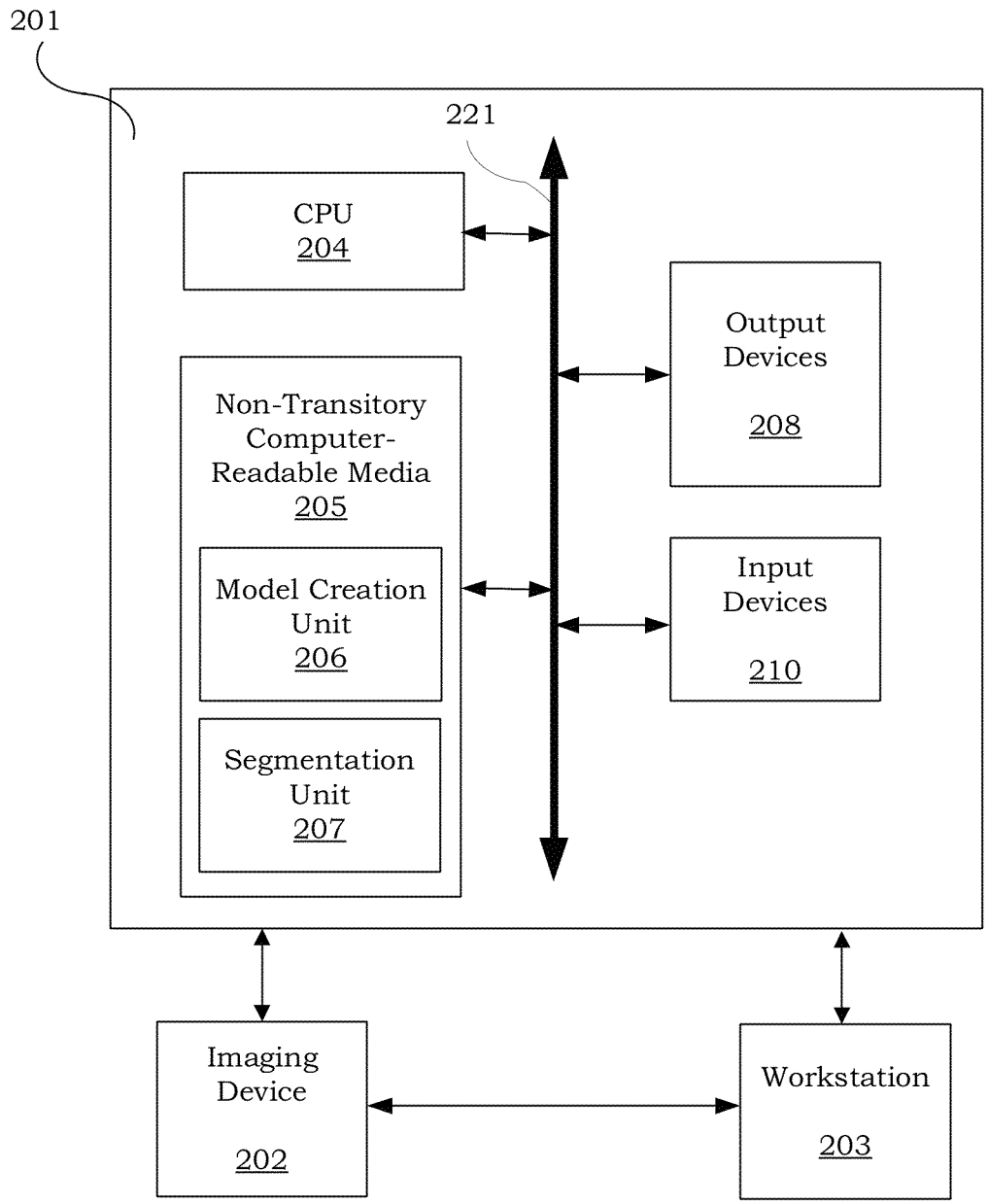
FIG. 2 is a block diagram illustrating an exemplary imaging system.

FIG. 2 is a block diagram illustrating an exemplary imaging system 200. The imaging system 200 includes a computer system 201 for implementing the framework as described herein. The computer system 201 may further be connected to an imaging device 202 and a workstation 203, over a wired or wireless network. The imaging device 202 may be a radiology scanner such as a magnetic resonance (MR) scanner, PET/MR, X-ray or a CT scanner.

Computer system 201 may be a desktop personal computer, a portable laptop computer, another portable device, a mini-computer, a mainframe computer, a server, a storage system, a dedicated digital appliance, or another device having a storage sub-system configured to store a collection of digital data items. In one implementation, computer system 201 comprises a processor or central processing unit (CPU) 204 coupled to one or more non-transitory computer-readable media 205 (e.g., computer storage or memory), output devices 208 (e.g., monitor, display, printer, etc.) and various input devices 210 (e.g., mouse, keyboard, touch pad, voice recognition module, etc.) via an input-output interface 221. Computer system 201 may further include support circuits such as a cache, a power supply, clock circuits and a communications bus. Even further, computer system 201 may be provided with a graphics controller chip, such as a graphics processing unit (GPU) that supports high performance graphics functions.

It is to be understood that the present technology may be implemented in various forms of hardware, software, firmware, special purpose processors, or a combination thereof. In one implementation, the techniques described herein are implemented by model creation unit 206 and segmentation unit 207. Model creation unit 206 and segmentation unit 207 may include computer-readable program code tangibly embodied in non-transitory computer-readable media 205. Non-transitory computer-readable media 205 may include random access memory (RAM), read only memory (ROM), magnetic floppy disk, flash memory, and other types of memories, or a combination thereof. The computer-readable program code is executed by CPU 204 to control and/or process image data from imaging device 202.

As such, the computer system 201 becomes a specific-purpose computer system when executing the computer readable program code. The computer-readable program code is not intended to be limited to any particular programming language and implementation thereof. It will be appreciated that a variety of programming languages and coding thereof may be used to implement the teachings of the disclosure contained herein. Computer system 201 may also include an operating system and microinstruction code. The various techniques described herein may be implemented either as part of the microinstruction code or as part of an application program or software product, or a combination thereof, which is executed via the operating system. Various other peripheral devices, such as additional data storage devices and printing devices, may be connected to the computer system 201.

The workstation 203 may include a computer and appropriate peripherals, such as a keyboard and display, and can be operated in conjunction with the entire system 200. For example, the workstation 203 may communicate with the imaging device 202 so that the image data acquired by, for instance, imaging device 202 can be rendered at the workstation 203 and viewed on the display. The workstation 203 may include a user interface that allows a radiologist or any other skilled user (e.g., physician, technician, operator, scientist, etc.) to manipulate the image data. Further, the workstation 203 may communicate directly with computer system 201 to display acquired, reconstructed and/or processed image data. For example, a radiologist can interactively manipulate the displayed representation of the processed image data and view it from various viewpoints and in various reading modes.

Figure 3A:
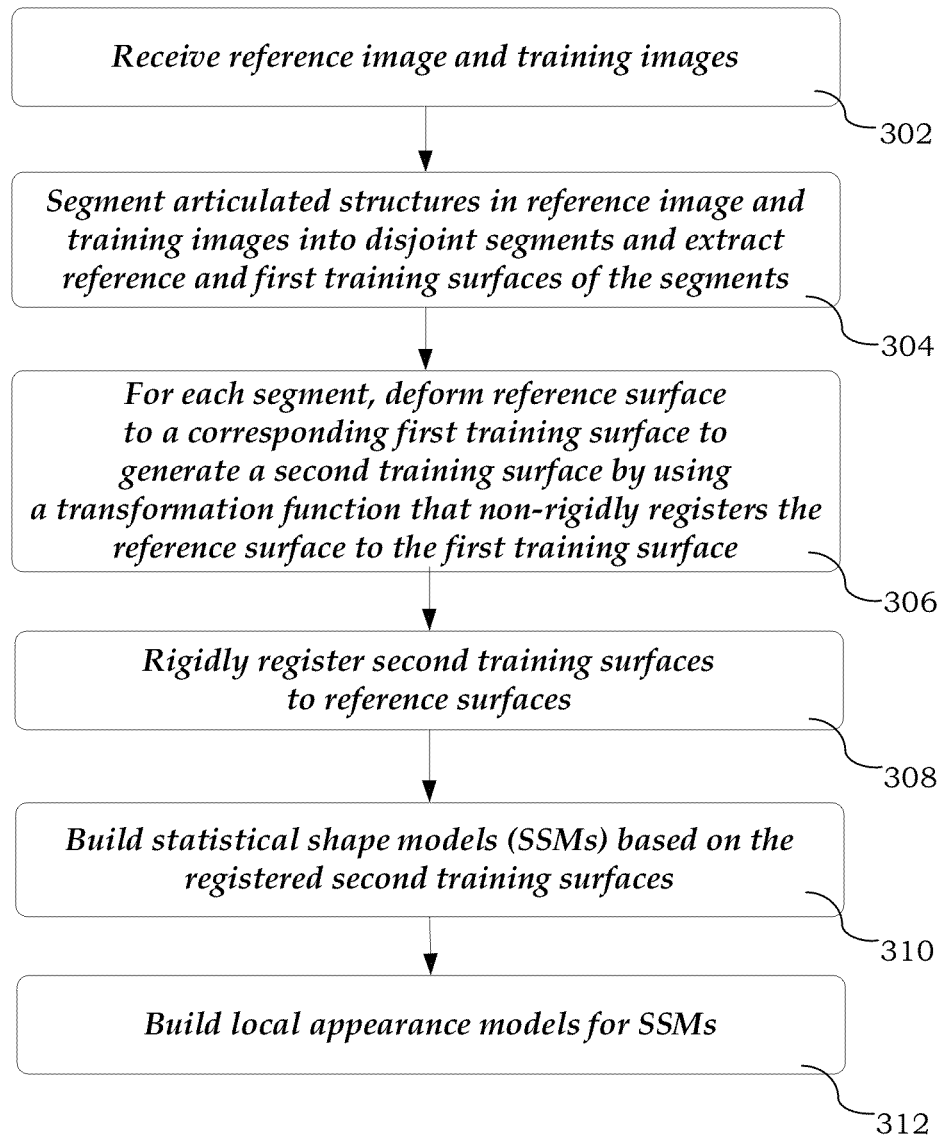
FIG. 3a shows an exemplary method for creating articulated shape models.

FIG. 3a shows an exemplary method 300 for creating articulated shape models. An articulated shape model may include a statistical shape model (SSM) for each articulated segment (e.g., hand bone). In some implementations, the method 300 is performed during an offline process (e.g., pre-operatively before a surgical intervention or procedure is performed on a subject). It should be noted that the steps of the method 300 may be performed in the order shown or a different order. Furthermore, different, additional or fewer steps may be implemented. Even further, the method 300 may be implemented with the system 200 of FIG. 2, a different system, or a combination thereof.

At 302, model creation unit 206 receives a reference image and training images of articulated structures. The reference image and training images may be acquired by, for example, imaging device 202, or retrieved from a data source. The reference image and training images may be acquired by one or more different imaging modalities, including but not limited to, magnetic resonance (MR) imaging, computed tomography (CT), helical CT, x-ray, positron emission tomography (PET), PET-CT, fluoroscopy, ultrasound, single-photon emission computed tomography (SPECT), SPECT-CT, MR-PET, etc. The articulated structures may include, for example, hand bones, foot bones, hip bones, wrist bones, elbow bones, knee bones, or any other articulated bone structures.

At 304, model creation unit 206 segments articulated structures in the reference image and training images into disjoint segments. For instance, in the context of a human hand which typically includes 19 bones, each of the 19 hand bones in the reference and training images may be segmented into disjoint (or separate) segments. Segmentation may be performed manually or semi-automatically. For example, a user may delineate each articulated structure in the images via a user interface at, for example, workstation 203. Other methods of segmentation are also useful.

In some implementations, a surface (e.g., triangular surface representation) of each disjoint segment may be extracted from the reference and training images. Reference surfaces may be extracted from the disjoint segments in the reference image, while first training surfaces may be extracted from the disjoint segments in the training images. Surface extraction may be automatically performed using, for example, the marching cubes algorithm, marching tetrahedra, or any other surface-generation algorithms. The reference and first training surfaces may further be regularized and decimated to make them (a) suitable for subsequent processing, and (b) improve execution speed of the framework.

At 306, model creation unit 206 deforms a reference surface for each segment to a corresponding first training surface in each training image to generate a second training surface. To perform the deformation, model creation unit 206 may first determine a transformation function for each segment that non-rigidly registers a reference surface to a corresponding first training surface. The transformation function may include, for example, a deformation field that provides one-to-one point correspondences across all surfaces. The transformation function may then be applied to the reference surface to deform it to the first training surface. The deformed reference surface may then be manually adjusted to correct any misalignment.

At 308, model creation unit 206 rigidly registers the second training surfaces to the reference surfaces. The registration transformation may have, for example, 7 degrees-of-freedom (DOF), three translations, three rotations and one isotropic scaling. Other types of transformations may also be used.

At 310, model creation unit 206 builds, for each segment (disjoint) of the articulated structures, statistical shape models (SSMs) based on the reference surface and rigidly registered second training surfaces. The SSM for each disjoint segment of the articulated structures may be stored in the reference image space. Eigenanalysis may be used to build the SSM for each segment. Each SSM may include a mean shape $\overline{x}$ and the eigenvectors $\{\vec{u}_j\}$ of the covariance matrix of the reference surface and rigidly-registered second training surfaces.

At 312, model creation unit 206 builds local appearance models for the SSMs. A local appearance model may be built for each patch center point in each SSM to achieve robust edge detection.

Figure 3B:
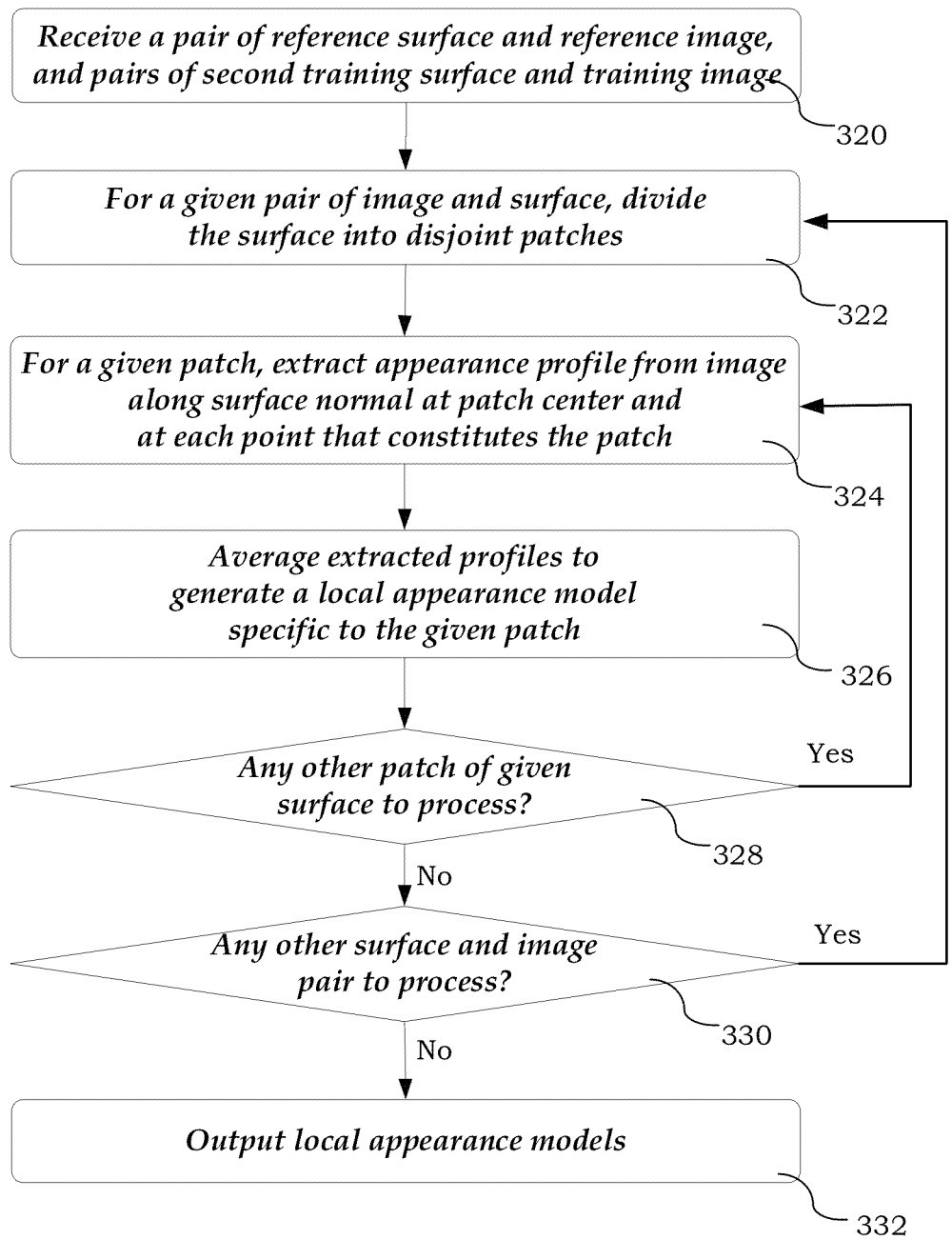
FIG. 3b shows an exemplary method of building local appearance models.

FIG. 3b shows an exemplary method 312 of building local appearance models for an SSM. The method 312 may be repeated to build local appearance models for all SSMs.

At 320, model creation unit 206 receives a pair of reference surface and reference image and corresponding pairs of second training surface and training image. The reference and training pairs are associated for each SSM (or disjoint segment).

At 322, for a given pair of image and surface, model creation unit 206 divides the surface into disjoint patches. Each patch may represent the first 2-ring neighboring vertices around a given central vertex. A local appearance model may be built for each surface patch (as will be described in steps 324 and 326). In other words, each patch center vertex on the shape model may be associated with one local appearance model (or edge model).

At 324, for a given patch, model creation unit 206 extracts an appearance profile from the image along the surface normal at the patch center and at each point that constitutes that patch. The appearance profiles may be stored in a library for future retrieval. For each jth image-surface pair with surface $\{x_{ji}\}_{i=0}^{N-1}$, an appearance profile at the ith patch center and at each of the points that constitute the given patch may be extracted along the surface normal at the respective points. Each appearance profile may include the intensity and the first order gradient of the image sampled at regularly spaced points along the normal vector. Thus, for the ith patch, the profile $g(x_{ji})$ is determined as the average of all profiles extracted at the points that constitute the patch. The local appearance model associated with the ith patch is the set of average profiles extracted at each jth image-surface pair $\{g(x_{ji})\}_{j=0}^{M-1}$, wherein M is the number of image-surface pairs (i.e., reference and second training image-surface pairs). Samples may be extracted at, for instance, 11 regularly spaced points along the surface normals at the points. The sample points along the normal vector are separated by a pre-defined regular step size $\Delta d$.

In some implementations, a hierarchical shape-deformation strategy is performed, in which case a model may be built for each scale. Different step sizes may be defined for different levels of scale. For example, the largest scale is built with a step size $\Delta d$ of 1.0 mm, the middle scale with step size $\Delta d$ of 0.5 mm, and the finest scale with step size $\Delta d$ of 0.25 mm. Thus, for the largest scale, the profile may be extracted over a range of [−5*1, 5*1] mm or 11 mm; the middle scale over a range of [−5*0.5, 5*0.5] mm or 5.5 mm; and the smallest scale over a range of [−5*0.25, 5*0.25] mm or 2.75 mm.

At 326, model creation unit 206 determines the average of the extracted profiles (i.e., average profile feature) to generate the local appearance model specific to the given patch. Mathematically, the average profile feature, $g(x_{ji})$ at the ith patch in the jth training surface is given by, $$g(x_{ji}) = \left\{ \frac{1}{L}\sum_{l=0}^{L-1} I_j(x_{jil} + \Delta d \cdot k \cdot \hat{n}_{jil}), \frac{1}{L}\sum_{l=0}^{L-1} (I_j(x_{jil} + \Delta d \cdot (k+1) \cdot \hat{n}_{jil}) - I_j(x_{jil} + \Delta d \cdot (k-1) \cdot \hat{n}_{jil})) \right\}_{k=-5}^{k=5}, \quad (1)$$

wherein L is the number of 2-ring neighboring vertices around $x_{ji}$, $\Delta d$ is a step size, $\hat{n}_{jil}$ is a unit normal vector, and $I_j(\bullet)$ is the intensity of the jth training image at a given point.

The overall local appearance model for the ith patch for a step size $\Delta d$ is given by $$\{g(x_{ji})\}_{j=0}^{M-1} \text{ for } j \in [0,1,\ldots,M-1], \quad (2)$$

wherein M is the number of training surfaces, and N is the number of patches in the SSM.

At 328, model creation unit 206 determines if there is any other patch of the given surface to process. If there is, the method 312 returns to 324 to process the other patch. If there is no other patch to process, the method 312 proceeds to 330. At 330, model creation unit 206 determines if there is any other surface and image pair to process. If there are, the method 312 returns to 322 to process other surface and image pairs. If there are no other surface and image pair to process, the method 312 proceeds to 332. At 332, model creation unit 206 outputs local appearance models.

Figure 4:
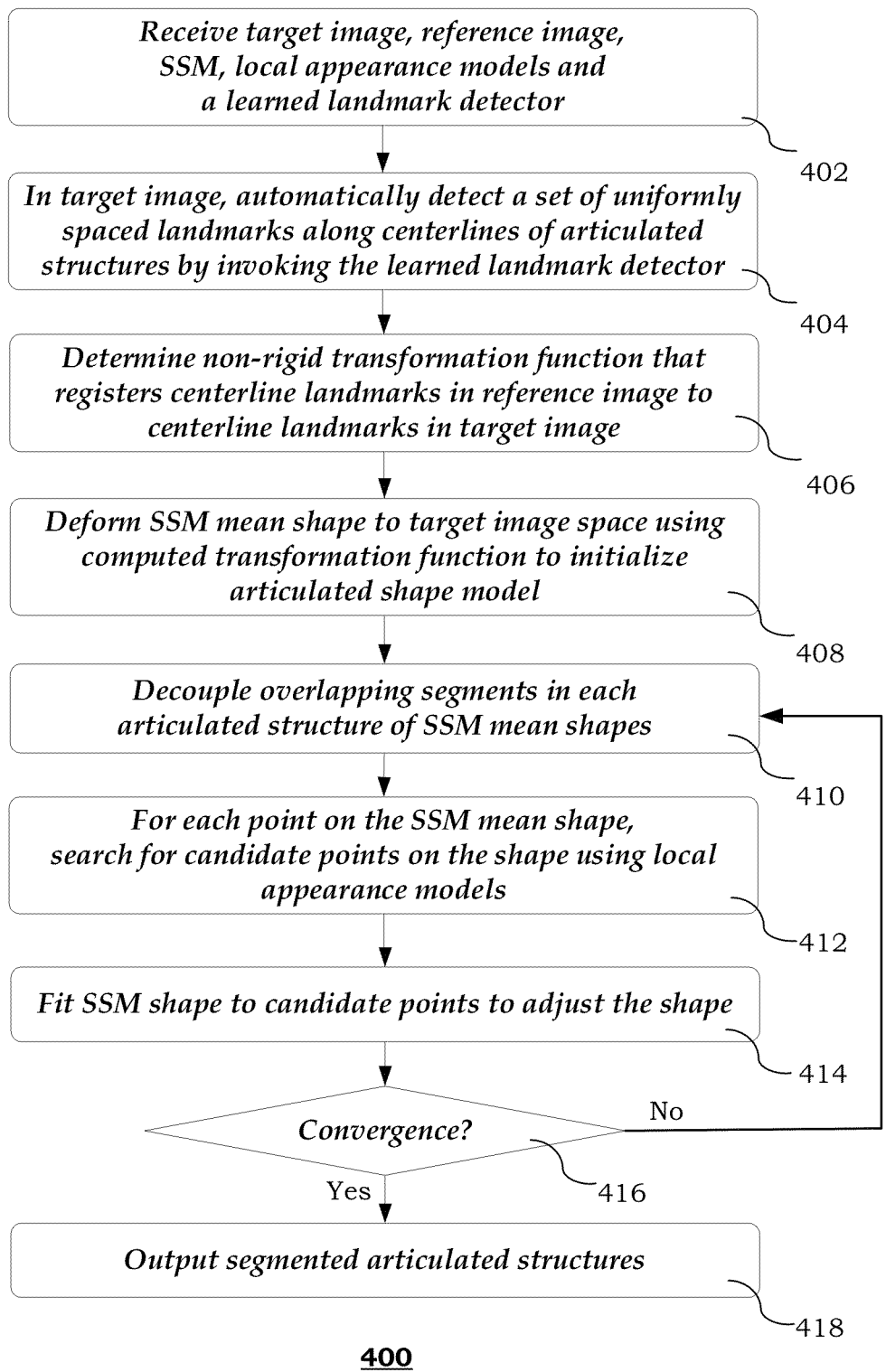
FIG. 4 shows an exemplary segmentation method.

FIG. 4 shows an exemplary segmentation method 400 that employs iterative hierarchical shape deformation. In some implementations, the method 400 is performed online (e.g., intra-operatively while a surgical intervention or procedure is performed on a subject or patient). It should be noted that the steps of the method 400 may be performed in the order shown or a different order. Furthermore, different, additional or fewer steps may be implemented. Even further, the method 400 may be implemented with the system 200 of FIG. 2, a different system, or a combination thereof.

At 402, segmentation unit 207 receives target image of a subject, a reference image, the SSMs, local appearance models and learned landmark detector. The target image includes articulated structures to be segmented. The articulated structures may include, for example, hand bones, foot bones, hip bones, wrist bones, elbow bones, knee bones, or any other articulated bone structures. The target image of the subject (e.g., patient) may be acquired by, for example, imaging device 202. The target image may be acquired by one or more different imaging modalities, including but not limited to, magnetic resonance (MR) imaging, computed tomography (CT), helical CT, x-ray, positron emission tomography (PET), PET-CT, fluoroscopy, ultrasound, single-photon emission computed tomography (SPECT), SPECT-CT, MR-PET, etc.

The SSMs and local appearance models may be generated by, for example, methods 300 and 312, as previously described with reference to FIGS. 3a and 3b. The learned landmark detector may be trained during an offline process using a machine learning technique to detect a point on a centerline of a set of articulated structures (e.g., finger). The reference image may include a pre-determined set of landmarks along centerlines of articulated structures (e.g., five fingers). The centerline landmarks may be manually or semi-automatically identified.

At 404, segmentation unit 207 automatically detects a set of landmarks along centerlines of articulated structures in the target image. The set of landmarks may be uniformly spaced along the centerlines. To detect the centerline landmarks, the learned landmark detector may first be invoked to automatically detect a point on the centerline of an articulated structure in the target image. Next, region growing may be performed by using the detected point as a seed to obtain a mask (e.g., binary mask) of the articulated structure. A skeleton of the mask may then be extracted using, for instance, a hierarchical skeleton extraction algorithm. Finally, centerline landmarks may be determined by regularly sampling points along the extracted skeletons. The process may be repeated to detect centerline points for each articulated structure in the target image.

At 406, segmentation unit 207 determines a non-rigid transformation function that registers centerline landmarks in the reference image to centerline landmarks in the target image. In some implementations, the transformation function includes a thin-plate splines (TPS) transformation function. Other types of transformation functions are also useful.

At 408, segmentation unit 207 deforms the SSM mean shapes to the target image space using the computed non-rigid transformation function. This step serves to initialize the SSMs in the target image space.

At 410, segmentation unit 207 decouples overlapping segments of each articulated structure in the SSM mean shapes. Since deforming the SSM mean shapes using a non-rigid transformation in the previous step 408 can lead to changes in topology of the shape, such as overlapping of neighboring articulated structures, the topology of the shape may be recovered by decoupling those structures that are overlapping. In some implementations, to perform the decoupling, segmentation unit 207 may first automatically identify the surface patch in a given articulated structure that is intersecting with a neighboring articulated structure. Next, the normal of this surface patch may be determined as the average of the surface normals at the vertices that constitute the patch. Finally, the intersecting structures may be iteratively moved apart by translating them along their patch normal with a predetermined step size (e.g., 0.5 mm) until the structures are completely separated At 412, for each point on the shape, segmentation unit 207 searches for candidate points on the SSM mean shapes using the local appearance models. Candidate points are points that can feasibly form part of the segmentation mask. For each patch point set $y_i = \{y_{il}\}_{l=0}^{L-1}$ in the mean shape, a new candidate patch point set $y'_i = \{y'_{il}\}_{l=0}^{L-1}$ may be selected as follows:

$$y'_{il} = y_{il} + \Delta d \cdot k_{min} \cdot \hat{n}_i, \quad (3)$$

wherein $\Delta d$ is a step size, and $k_{min}$ is chosen to minimize the cost function $C_i(\bullet)$:

$$k_{min} = \arg\min_k C_i(k) : k \in [-5,5]. \quad (4)$$

The cost function $C_i(\bullet)$ may be designed for candidate point selection for each point in the patch as a function of the local appearance model previously built. The cost at the ith patch may be given by:

$$C_i(k) = \min_{j \in [0, 1, \ldots, M-1]} \|g(y_i + \Delta d \cdot k \cdot \hat{n}_i) - g(x_{ji})\| : k \in [-5,5] \quad (5)$$

wherein $g(y_i + \Delta d \cdot k \cdot \hat{n}_i)$ is the appearance profile feature extracted at the kth patch along the patch normal $$\hat{n}_i = \frac{1}{L}\sum_{l=0}^{L-1} \hat{n}_{il}$$

with L being the number of 2-ring neighboring vertices, and $\{g(x_{ji})\}_{j=0}^{M-1}$ is the local appearance model associated with the ith patch.

At 414, segmentation unit 207 fits the SSM mean shape to the candidate points to adjust the shape. Starting from the initial shape $y = \{\{y_{il}\}_{l=0}^{L-1}\}_{i=0}^{N-1}$, the shape can be iteratively adjusted for a better match to the boundaries of the bones in the target image I. Once the patch candidate points $y'_i = \{y'_{il}\}_{l=0}^{L-1}$ are determined in the previous step 412, the SSM shape is fitted to the candidate shape $y' = \{\{y'_{il}\}_{l=0}^{L-1}\}_{i=0}^{N-1}$, wherein L*N is the total number of points in the shape, to obtain an adjusted shape.

To perform the fitting procedure, first, the candidate shape y' is registered to the SSM mean shape $\bar{x}$. The registration may be performed by applying a 7-degree of freedom (DOF) transformation T (e.g., three translations, three rotations, and one isotropic scaling factor). Then, the adjusted shape $y'' = \{\{y''_{il}\}_{l=0}^{L-1}\}_{i=0}^{N-1}$ may be computed using the equation, $$y''_{il} = T^{-1}(\bar{x}_{il} + \Sigma_{j=1}^{M-1} b_j \vec{u}_{j,il}) \quad (6)$$

wherein $$b_j = u_j^T(T(y') - \bar{x}). \quad (7)$$

In some implementations, only a few number of shape instances is used to build the shape model. A weighted combination of the candidate shape y' and the fitted shape y'' may be determined to obtain a final shape $y^f = \{\{y_{il}^f\}_{l=0}^{N-1}\}_{i=0}^{N-1}$, in which $$y_{il}^f = w \cdot y''_{il} + (1-w) \cdot y'_{il}, \quad (8)$$

wherein w is a weight (e.g., 0.9) that determines the relative importance of the two point sets.

At 416, segmentation unit 207 determines if a convergence criteria is satisfied. In some implementations, the convergence criteria is as follows:

$$1/(P)\Sigma_{i=0}^{N-1}\Sigma_{l=0}^{L-1}\|y_{il}^f - y_{il}\| < \epsilon, \quad (9)$$

wherein P=L*N is the total number points in the shape, and $\epsilon$ is empirically set to 0.01 mm. It should be appreciated that other types of convergence criteria may also be used. If the convergence criteria is not satisfied, the method 400 returns to step 410. If the convergence criteria is satisfied, at 418, segmentation unit 207 outputs the segmentation mask of the articulated structures in the target image.

The shape deformation strategy described with reference to FIG. 4 may be performed in a hierarchical scheme. At the coarse scale, the search for candidate points may be performed with in a profile of, for example, length 11 mm centered at the given points; the middle scale within a profile of, for instance, length 5.5 mm; and the fine scale within a profile of, for instance length 2.75 mm. In other words, the step size $\Delta d$ in Equation (5) may be 1 mm for the higher scale, 0.5 mm for the middle scale and 0.25 mm for the smallest scale.

The present framework has been evaluated (a) quantitatively using four training CT images in a leave-one-out approach, and (b) qualitatively using 23 testing CT images. Typical voxel size of the scans is 0.8×0.8×1.0 mm³. The training CT images were used for building both statistical shape models and local appearance models of hand bones. One of the training CT images was selected to serve as a reference image. Both the shape and appearance models were stored in the reference image space. The testing CT images were used to qualitatively evaluate the performance of the framework. The four training CT images were used to quantitatively evaluate the framework. The execution time for segmenting one hand was approximately 30 seconds.

To perform the quantitative evaluation, for each bone in each CT image, the automatically generated surface was compared to the manually generated surface. Specifically, for each point on the automatically generated surface, the distance to the closest point on the manually generated surface was measured. Table 1 presents the mean and maximum errors for the four training CT images. As can be seen in Table 1, the overall average errors are sub-millimetric (<1 mm).

TABLE 1

| Surface distance | Training CT image 1 | Training CT image 2 | Training CT image 3 | Training CT image 4 |
| --- | --- | --- | --- | --- |
| Mean (mm) | 0.411 | 0.702 | 0.510 | 0.557 |
| Maximum (mm) | 2.31 | 5.34 | 1.50 | 2.45 |

Figure 5:
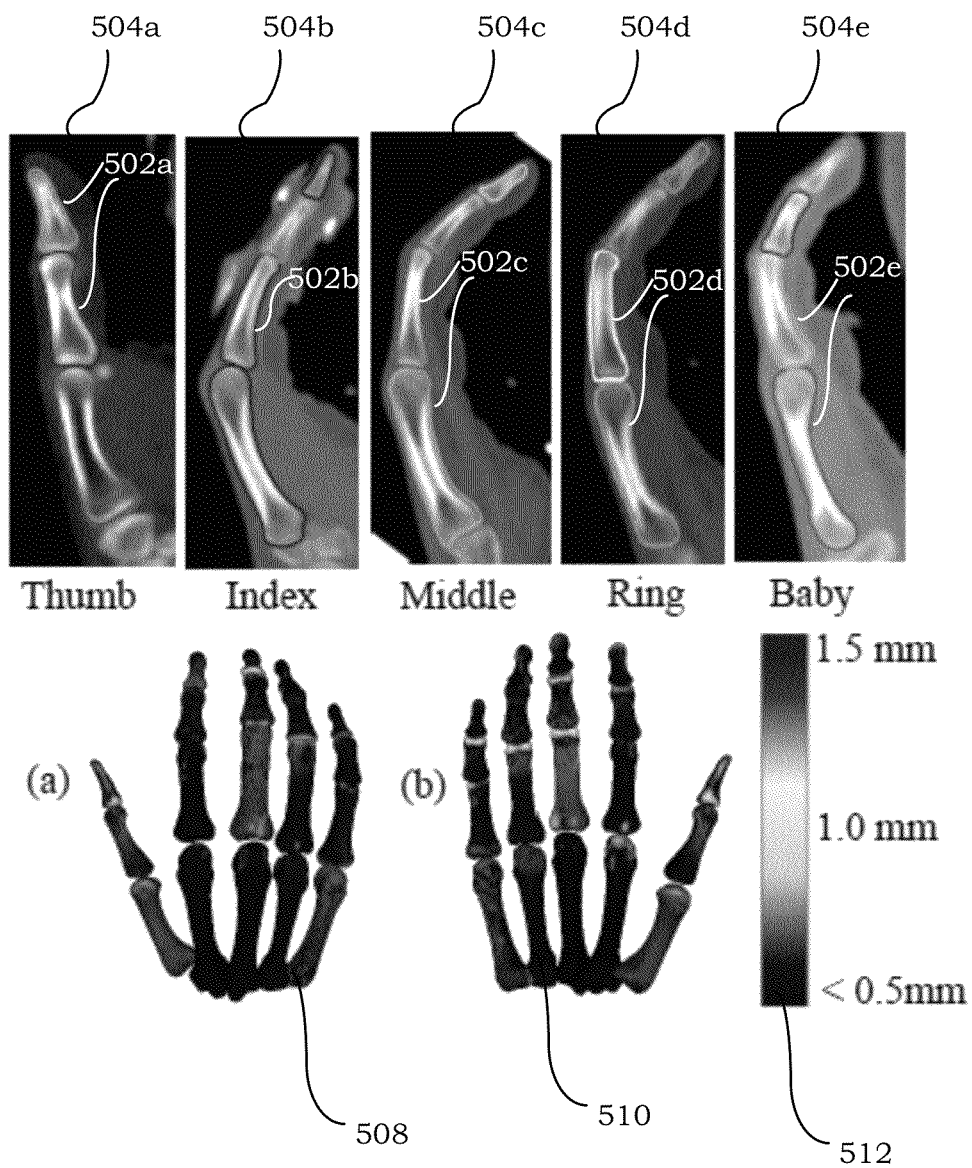
FIG. 5 shows exemplary quantitative segmentation results for a training CT image.

FIG. 5 shows exemplary quantitative segmentation results for training CT image 3. The top row shows bone contours 502*a-e* overlaid on the CT images 504*a-e* for different fingers. To visualize the full length of each finger, the CT image was interpolated on the plane determined by the automatically detected finger centerline points. The bottom row shows corresponding surface models 508 and 510 of hand bones in two different orientations (a) and (b). The surface models 508 and 510 were color-mapped (using color map 512) with segmentation errors at each point. Good agreement between the generated contours 502a-e and bone boundaries can be observed. In the color-mapped surfaces 508 and 510, relatively large errors are shown at the joints, which are ambiguous regions that lead the edge detector to mis-detect edges from the neighboring bones.

Figure 6:
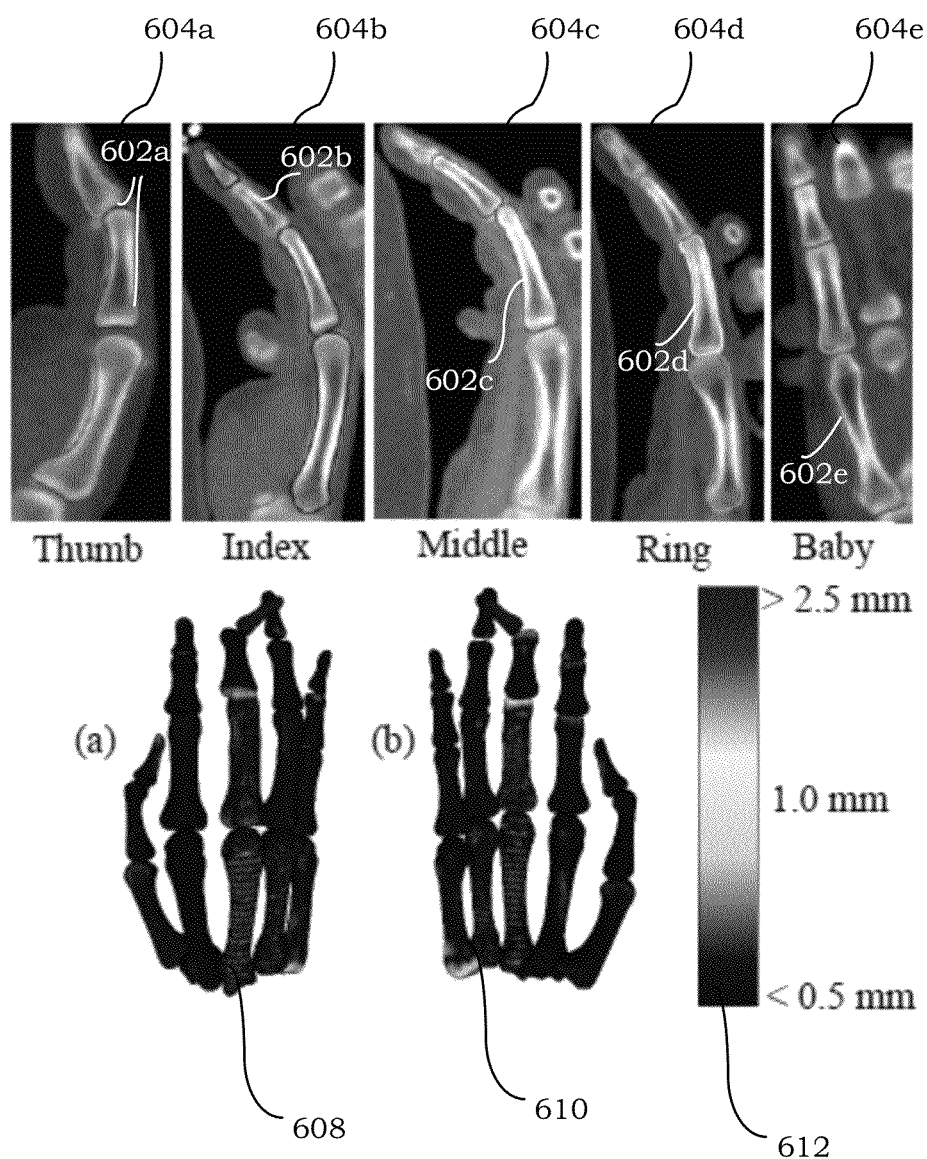
FIG. 6 shows exemplary quantitative segmentation results for another training CT image.

FIG. 6 shows exemplary quantitative segmentation results for training CT image 2. The top row shows bone contours 602a-e overlaid on the CT images 604a-e for different fingers. The bottom row shows corresponding surface models 608 and 610 of hand bones in two different orientations (a) and (b). As shown in the color-mapped surfaces 608 and 610 (using color map 612), for the majority of the points the segmentation errors are low. Large errors can be observed at the tip-bone of the middle finger. This is due to the initial errors in the shape initialization step that were too large to be recovered by subsequent hierarchical shape fitting step. Such large initial errors may occur when the automatically detected finger centerlines do not extend well into the tip of the fingers. That is, the TPS transformation that registers finger centerlines may lead to poor initialization when it is used to deform the mean shape to the target image space.

To qualitatively evaluate the segmentation quality of the present framework, the automatically generated contours for each bone in each CT image were compared to the actual bone boundaries. A bone was deemed as successfully segmented when no larger than two voxels (~1.6 mm) disagreement was observed between the automatically generated contours and the outer bone boundaries.

Figure 7:
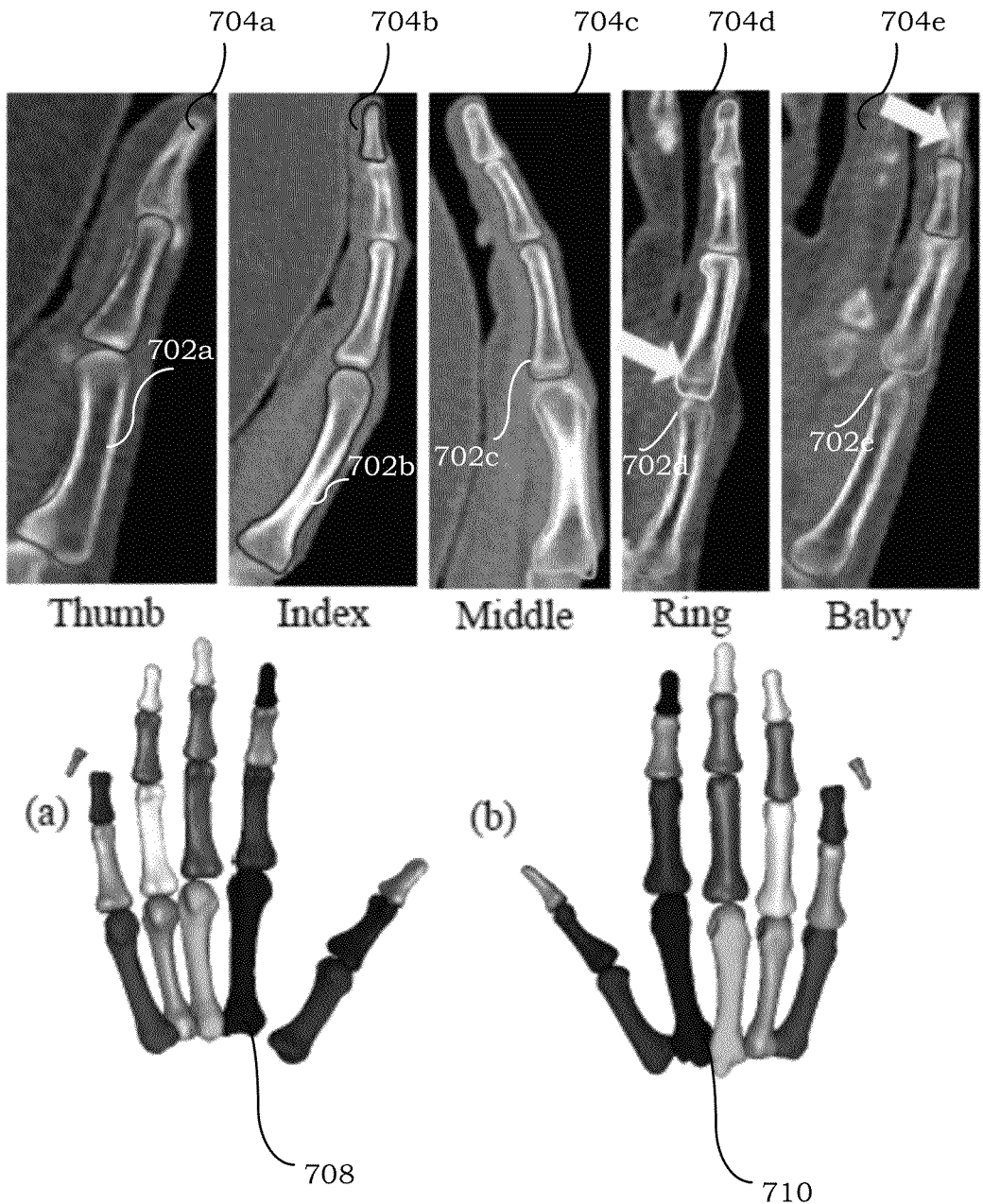
FIG. 7 shows exemplary qualitative segmentation results for a flat hand.
Figure 8:
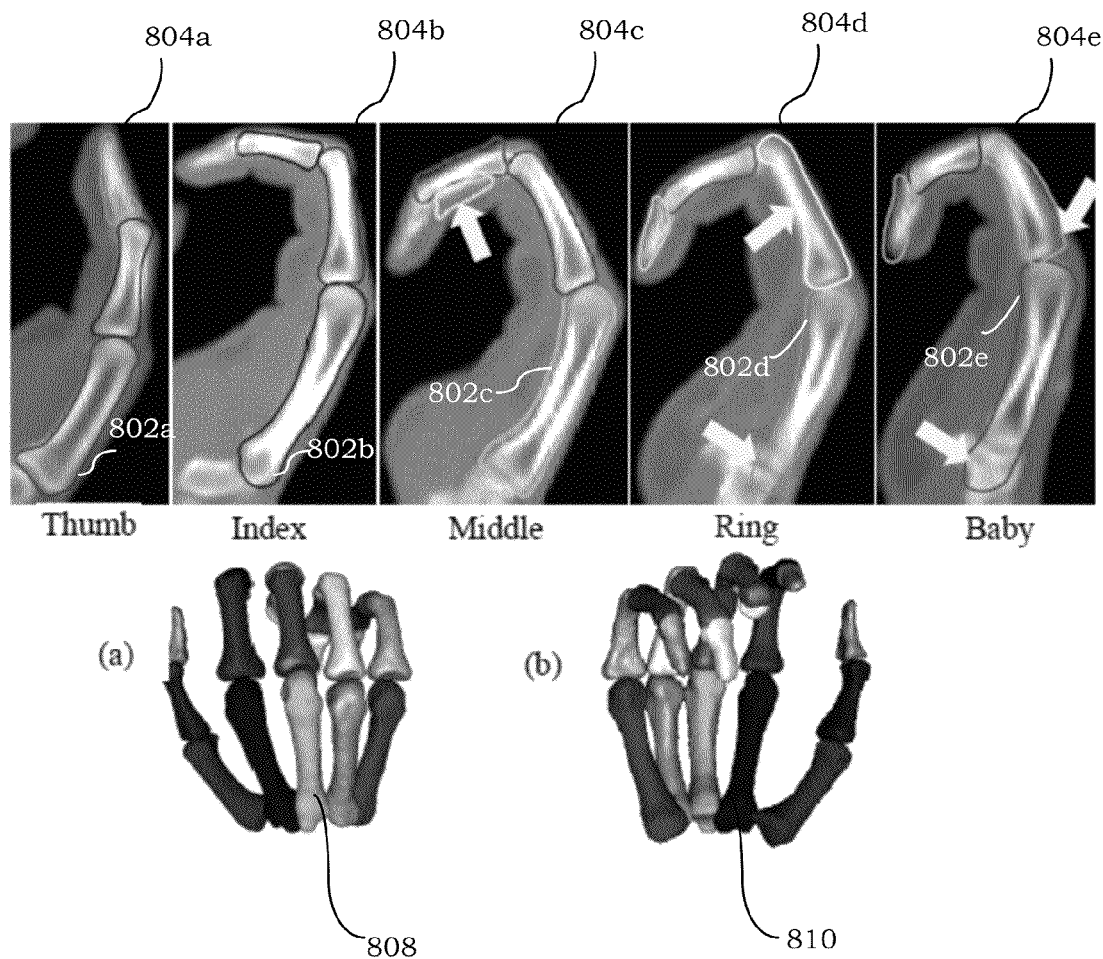
FIG. 8 shows exemplary qualitative segmentation results for a folded hand.

FIG. 7 shows exemplary qualitative segmentation results for a flat hand. The top row shows the generated bone contours 702a-e overlaid on the images 704a-e for different fingers, and the bottom row shows the surface models 708 and 710 of the hand bones viewed in two different orientations (a) and (b). FIG. 8 shows exemplary qualitative segmentation results for a folded hand. The top row shows the generated bone contours 802a-e overlaid on the images 804a-e for different fingers, and the bottom row shows the surface models 808 and 810 of the hand bones viewed in two different orientations (a) and (b).

For the majority of bones, good agreement can be observed between the automatically generated contours and the actual bone boundaries. Bones that were considered as incorrectly segmented are indicated with solid arrows. Overall, out of the 23*19=437 bones—with 19 bones in each hand in the CT image—successful segmentation was achieved on 392 of them, which is a segmentation success rate of ~89.70%. The majority of the poorly segmented bones were the tip bones.

While the present invention has been described in detail with reference to exemplary embodiments, those skilled in the art will appreciate that various modifications and substitutions can be made thereto without departing from the spirit and scope of the invention as set forth in the appended claims. For example, elements and/or features of different exemplary embodiments may be combined with each other and/or substituted for each other within the scope of this disclosure and appended claims.

The invention claimed is:

1. A non-transitory computer-readable medium embodying a program of instructions executable by machine to perform steps for segmenting articulated structures, the steps comprising:
   (i) generating statistical shape models and local appearance models based on a reference image and training images;
   (ii) receiving a target image;
   (iii) determining a non-rigid transformation function that registers first centerline landmarks along centerlines of articulated structures in the reference image with second centerline landmarks along centerlines of articulated structures in the target image;
   (iv) deforming mean shapes of the statistical shape models to the target image space by applying the non-rigid transformation function on the mean shapes;
   (v) decoupling any overlapping segments of articulated structures in the mean shapes;
   (vi) searching for candidate points in the mean shapes using the local appearance models; and
   (vii) fitting the mean shapes to the candidate points to generate a segmentation mask.

2. The computer-readable medium of claim 1 embodying further instructions executable by the machine to automatically detect the second centerline landmarks by using a learned landmark detector.

3. A computer-implemented method of segmenting articulated structures, comprising:
   (i) receiving a target image, a reference image, statistical shape models, local appearance models and a learned landmark detector;
   (ii) automatically detecting first centerline landmarks along centerlines of articulated structures in the target image using the learned landmark detector;
   (iii) determining a non-rigid transformation function that registers second centerline landmarks along centerlines of articulated structures in the reference image with the first centerline landmarks;
   (iv) deforming mean shapes of the statistical shape models to the target image space by applying the non-rigid transformation function on the mean shapes;
   (v) searching for candidate points in the mean shapes using the local appearance models; and
   (vi) fitting the mean shapes to the candidate points to generate a segmentation mask.

4. The method of claim 3 wherein automatically detecting the first centerline landmarks comprises:
   invoking the learned landmark detector to automatically detect a point on at least one of the centerlines in the target image;
   performing region growing by using the detected point as a seed to generate a mask;
   extracting a skeleton of the mask; and
   sampling points along the extracted skeleton to generate the first centerline landmarks.

5. The method of claim 3 wherein registering the second centerline landmarks with the first centerline landmarks comprises performing a thin-plate splines transformation function.

6. The method of claim 3 further comprising decoupling any overlapping segments of articulated structures in the mean shapes.

7. The method of claim 6 wherein decoupling any overlapping segments of the articulated structures comprises:
   identifying a surface patch in a given first articulated structure that is intersecting with a neighboring second articulated structure;
   determining a normal of the surface patch; and
   iteratively moving apart the first and second articulated structures until the first and second articulated structures are separated.

8. The method of claim 3 further comprising repeating at least steps (v) and (vi) until a convergence criteria is satisfied.

9. The method of claim 3 further comprising generating the statistical shape models based on the reference image and training images.

10. The method of claim 9 wherein generating the statistical shape models comprise:
- segmenting articulated structures in the reference image and the training images into disjoint segments;
- extracting reference surfaces and first training surfaces of the disjoint segments in the reference image and the training images;
- generating second training surfaces by deforming the reference surfaces to corresponding first training surfaces;
- rigidly registering the second training surfaces to the reference surfaces; and
- building the statistical shape models based on the registered second training surfaces.

11. The method of claim 10 wherein generating the second training surfaces comprises applying a deformation field that provides one-to-one point correspondences to the reference surfaces.

12. The method of claim 10 wherein rigidly registering the second training surfaces comprises applying a 7 degrees-of-freedom transformation to the second training surfaces.

13. The method of claim 10 wherein building the statistical shape models comprises generating a mean shape and eigenvectors of a covariance matrix of the registered second training surfaces by using eigenanalysis.

14. The method of claim 10 further comprising generating the local appearance models for points in the statistical shape models.

15. The method of claim 14 wherein generating the local appearance models comprises:
- receiving a pair of reference surface and reference image and corresponding pairs of second training surface and training image associated with at least one of the statistical shape models;
- dividing the reference surface and the second training surfaces into disjoint patches; and
- generating local appearance models for the disjoint patches.

16. The method of claim 15 wherein at least one of the disjoint patches represent first 2-ring neighboring vertices around a given central vertex.

17. The method of claim 15 wherein generating the local appearance models comprises:
- extracting appearance profiles from the reference and training images along surface normals of the disjoint patches; and
- averaging the extracted appearance profiles to generate the local appearance models.

18. The method of claim 17 wherein extracting the appearance profiles comprises extracting the appearance profiles at different step sizes along the surface normals for different levels of scale.

19. An image segmentation system, comprising:
- a non-transitory memory device for storing computer-readable program code; and
- a processor in communication with the memory device, the processor being operative with the computer-readable program code to perform steps comprising
  (i) receiving a target image, a reference image, statistical shape models and local appearance models,
  (ii) determining a non-rigid transformation function that registers first centerline landmarks along centerlines of articulated structures in the reference image with second centerline landmarks along centerlines of articulated structures in the target image,
  (iii) deforming mean shapes of the statistical shape models to the target image space by applying the non-rigid transformation function on the mean shapes,
  (iv) searching for candidate points in the mean shapes using the local appearance models, and
  (v) fitting the mean shapes to the candidate points to generate a segmentation mask.

20. The system of claim 19 wherein the articulated structures in the reference image and the target image comprise bone structures.

* * * * *